Patented Mar. 17, 1931

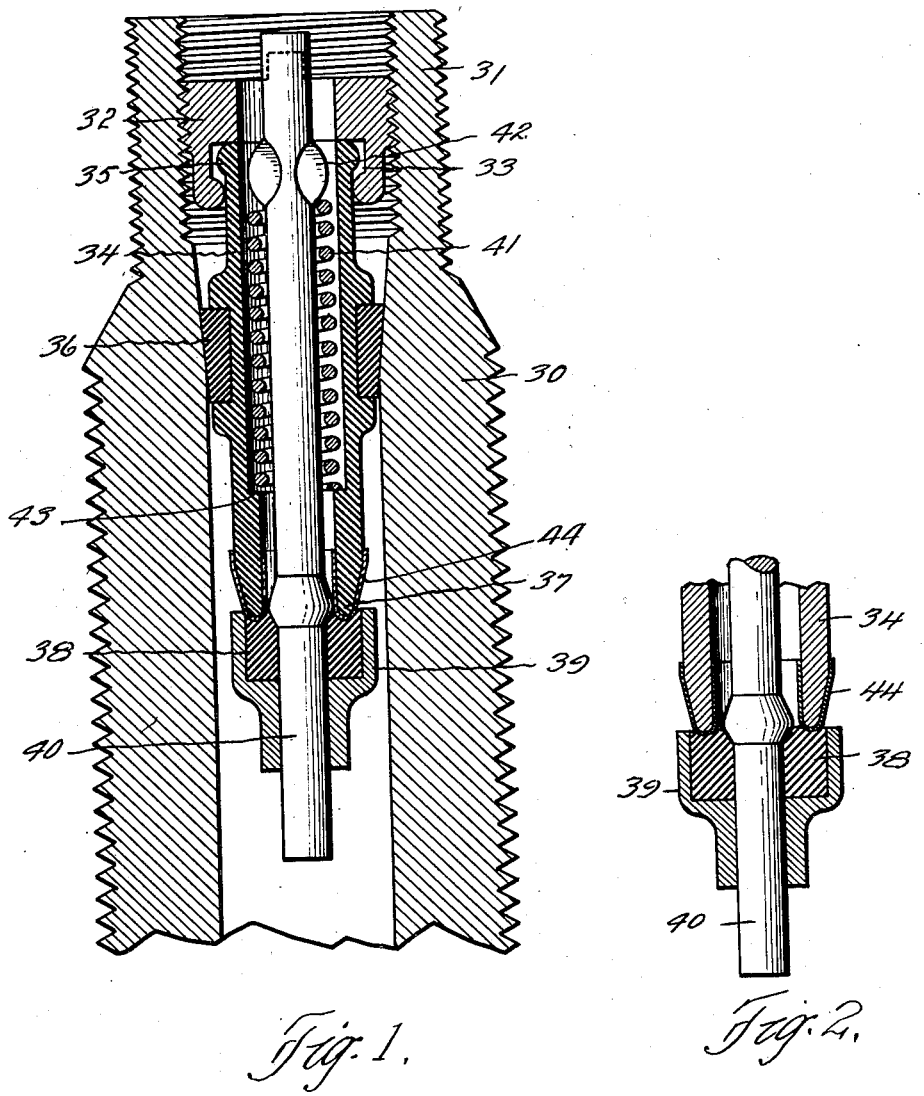

1,797,036

UNITED STATES PATENT OFFICE

LEOPOLD J. WOLF, OF CLEVELAND, AND DELPHIN H. SPICER, OF LAKEWOOD, OHIO

VALVE

Application filed April 6, 1929. Serial No. 352,947.

This invention relates to valves wherein rubber is employed as one of the cooperating members (valve body and seat) and has for its general object to overcome certain objections that have arisen in connection with such valves, and particularly where they are employed for delivering air under pressure, as to the tires of automobiles.

As valves of this type have been and are usually constructed, they comprise generally a rubber member and a cooperating metal member. Where these members are subjected to the action of compressed air, the temperature of the rubber is raised with the result that the sulphur therein forms with the contacting valve member a compound which attacks the gum of the rubber, causing it to soften and to adhere to the metal valve member. This adhesion results in the tearing of the rubber member of the valve as the metal member is separated therefrom. Where copper is employed for the metal member, the sulphur in the rubber unites with the copper to form copper sulphate, and this salt attacks the rubber and causes the softening and disintegration referred to.

Where valves of the character referred to are utilized in connection with the inflation of tires wherein it is desired to maintain a certain maximum pressure, the adhesion of the valve members requires for their separation the utilization of a greater pressure of air than would otherwise suffice and results in delivering air at a lower pressure into the tires than is desirable.

We have found that, by substituting phenol condensate for the metallic members of valves of the character referred to, or by coating more or less of the metallic valve member with phenol condensate, the disadvantages referred to are overcome.

In the drawings forming part hereof, Fig. 1 represents a central longitudinal section view through a valve such as is employed in the valve stems of tires for inflating the latter; and Fig. 2 a detail in sectional elevation of the same.

In Fig. 1 our invention is shown as embodied in a tire-inflating valve such as is used with the tires of automobiles. In this view, 30 denotes a valve stem of the ordinary type having the cap-receiving end 31 and a swivel mounting 32 provided with an annular seat 33 which receives one end of the tubular valve member 34, the said end having an annular projection 35 for retaining the end of the said member within the said seat. The valve member 34 is provided intermediate the length thereof with a packing 36 surrounding the same and engaging the inner tapered wall of the valve stem. Its lower end is tapered, as shown at 37, to cooperate with a rubber washer 38 carried by a cup 39 mounted on a stem 40. Surrounding the said stem within the valve member 34 is a spring 41 which engages one or more projections 42 on the said stem with one end and an annular seat 43 formed within the said valve member with its other end.

In operation, air is forced downwardly through the valve member 34, unseating the movable member 38, 39. The valve portion 34 is composed of an elongated tubular metallic seat engaging portion adapted to cooperate with the soft rubber seat 38. At the lower end the tubular seating portion 34 is tapered inwardly for the purpose of allowing as great diameter as possible over the major portion of the lower half thereof and yet clearing the rim of the cup which contains the valve seat 33.

In order to prevent chemical interaction, slow vulcanization or any other causes of sticking between the soft rubber valve seat and the valve engaging portion, we provide the lower end of the tubular seat engaging portion with a thin coating of phenol condensate. It will be noted that this covering 44 extends above the top of the tapered portion thereby resulting in firmer adherence of the same to the tubular metallic portion and avoiding the tendency to become loosened therefrom. The tubular portion is coated both inside and out with a continuous coating whereby the metal portions of the stem are entirely prevented from coming into contact with the soft rubber seat. Experiments have demonstrated that the herein described arrangement results in a very materially improved valve core and one which will not only have longer life but will obviate to a large extent the running of tires under-inflated and thereby increase their serviceable life.

Having thus described our invention, what we claim is:

A pneumatic tire valve including a soft rubber seat and a cylindrical tubular metallic seating portion having one end thereof co-operating with said seat, the outer convex surface of said seating portion adjacent said end being tapered and a thin, continuous covering of phenol condensate over said end portion inside and out and extending to a point beyond the tapered portion of said tubular member.

In testimony whereof, we hereunto affix our signatures.

LEOPOLD J. WOLF.
DELPHIN H. SPICER.